United States Patent [19]

Macedo et al.

[11] 4,302,231

[45] Nov. 24, 1981

[54] METHOD OF PRODUCING A GLASS ARTICLE HAVING A GRADED REFRACTIVE INDEX PROFILE OF A PARABOLIC NATURE

[75] Inventors: Pedro B. Macedo, 6100 Highboro, Bethesda, Md. 20024; Joseph H. Simmons, Bethesda, Md.; Shigeo Murai, Kyoto, Japan

[73] Assignees: Pedro Manoel Buarque De Macedo, Bethesda; Theodore Aaron Litovitz, Silver Spring, both of Md.

[21] Appl. No.: 7,192

[22] Filed: Jan. 29, 1979

[51] Int. Cl.$^3$ .................. C03B 37/025; C03B 37/075; C03C 21/00
[52] U.S. Cl. .................. 65/3.15; 65/30.13; 65/31
[58] Field of Search .......... 65/DIG. 7, 31, 30 R, 65/3 A, 30 E, 3 R, 2, 30.13, 3.14

[56] References Cited

U.S. PATENT DOCUMENTS

| | | | |
|---|---|---|---|
| 2,522,524 | 9/1950 | Lukes | 65/31 |
| 3,859,073 | 1/1975 | Schultz | 65/3 A X |
| 3,938,974 | 2/1976 | Macedo et al. | 65/30 R X |
| 4,061,486 | 12/1977 | Jahn | 65/31 X |
| 4,073,579 | 2/1978 | Deeg et al. | 65/31 X |
| 4,110,093 | 8/1978 | Macedo et al. | 65/30 R X |
| 4,110,096 | 8/1978 | Macedu et al. | 65/30 R |
| 4,188,198 | 2/1980 | Macedo et al. | 65/31 X |
| 4,225,330 | 9/1980 | Kakuzen et al. | 65/31 X |

Primary Examiner—Richard V. Fisher
Attorney, Agent, or Firm—Fleit & Jacobson

[57] ABSTRACT

A method of producing a glass article having a graded refractive index profile of a parabolic nature is disclosed. The method comprises soaking a preform having a porous matrix with interconnected pores into a stuffing solution containing at least one index modifying dopant of predetermined solubility in the stuffing solution for a time interval to fill the pores with the dopant solution, precipitating the dopant into the porous matrix approximately uniformly throughout, soaking the preform into a solvent solution having a solubility for the dopant lower than the solubility of the dopant in the stuffing solution for a time interval sufficient to cause substantially all of the dopant to redissolve and for diffusion to take place out of the porous matrix in such a way that the dopant concentration decreases as a function of radial distance from the central axis, precipitating the dopant in the porous matrix by reducing the temperature of the preform to a level such that the dopant is precipitated out of solution, removing the solvent and where necessary decomposition products from the preform, and heating to consolidate the preform to produce a glass article having a graded refractive index profile of the parabolic nature.

16 Claims, 10 Drawing Figures

METHOD OF PRODUCING A GLASS ARTICLE HAVING A GRADED REFRACTIVE INDEX PROFILE OF A PARABOLIC NATURE

This invention relates to the production of glass articles having graded refractive index profiles of a parabolic nature and, more particularly, to the production of preforms used for the making of optical glass fiber waveguides with graded refractive index distribution to minimize waveguide dispersion effects in communication systems.

BACKGROUND OF THE INVENTION

Optical fiber waveguides operate by the principle of total internal reflection which requires that the refractive index of the core, or inner portion of the waveguide be greater than the refractive index of the clad or outer portion. The actual variation of the refractive index at the core-clad region determines the waveguide dispersion. Mathematical formulations of waveguide dispersion have been presented and show that, for communication systems, graded index profiles resembling parabolae with the maximum at the fiber axis minimize dispersion. Denoting index of refraction by n and radial distance from the preform or fiber axis by r, the desired variation in index for optical communications is generally written as:

$$n = n_0(1 - ar^\alpha)$$

where $n_0$ is the maximum index at the fiber axis, a and $\alpha$ are design constant determined by the desired numerical aperture of the optical waveguide and its proposed use. The exponent $\alpha$ generally varies between 1.8 to 2.5. In the design of other integrated optics applications, such as for endoscope lenses or elements and other types of image transfer devices, it is often useful to use a more complex relation between n and r, which represents the next most useful equation:

$$n = n_0(1 - ar^\alpha + br^\gamma)$$

The constants in this equation are based on the desired optical performance design consideration and characteristics and can generally be derived by one practiced in the art. These equations give a mathematical description of the desired shape of the refractive index variation in the fibers, lenses and integrated optic elements.

A number of methods have been disclosed for producing graded refractive index profiles in fibers, lenses and integrated optics elements. One method for producing graded refractive index profiles in glass employs the so-called process of molecular stuffing and is disclosed in U.S. Pat. Nos. 4,110,093 and 4,110,096 issued Aug. 29, 1978. This method uses porous glass preforms whose pores are completely filled with a solution (called a stuffing solution) containing one or several index modifying dopants which raise the refractive index of the material making up the porous glass preform. The variation in refractive index is produced by soaking the filled preform in a solvent solution (called an unstuffing solution) which is free of dopant and has a solubility limit for the dopant which is higher than the dopant concentration in the solution within the pores. This allows dopant to diffuse back into the solvent and therefore produces a depleted region in the preform where the concentration of the dopant varies continuously from minimum to a maximum at some depth within the preform.

The above mentioned single step diffusion process limits the type of profiles obtainable and cannot sufficiently approach the desired parabolic profile. Satisfactory profiles have been obtained with the above process when:

(a) After stuffing, the preforms are soaked in 100° C. water for a time to be determined by experiment (15-45 min.) which varies depending upon the pore size of the porous glass used.

(b) The preform is immersed in 0° C. propanol until precipitation occurs.

Good parabolic profiles are reliably and reproducibly obtained by the above method if:

(1) Sample test runs are conducted in advance to determine the appropriate combination of unstuffing and precipitation times, and (2) Rods from glass having identical pore size are used. It will be understand that pore size depends on glass composition and heat treatment, more particularly heating temperature and annealing time.

A slight improvement in the quality of the profile, and a reduction of the variability of times has been obtained by the following process when:

(a) After stuffing, the preforms are soaked in 100° C. water for about 10 minutes.

(b) The preforms are then soaked in a 40% ethanol-water solution at 70° C. for a time to be determined by experiment (15-60 min.).

(c) The preforms are immersed in 0° C. propanol until precipitation occurs.

The above modified method yields slightly higher numerical apertures, but both last mentioned processes lack sufficient control over the experimental parameters, and are too sensitive to the processing times. In both cases, the times to precipitation vary with the soaking times. In addition, for long preforms normally of a length of 30 cms to 1 meter, precipitation times will be different at different ends of the preforms, possibly leading to a variation in profile along the length of the preform.

SUMMARY OF THE INVENTION

It is therefore the object of the present invention to develop graded index profiles of a near parabolic nature in preforms made by molecular stuffing.

The method, in accordance with the invention, comprises soaking a preform having a porous matrix with interconnected pores in a stuffing solution containing at least one index modifying dopant of predetermined solubility in the stuffing solution for a time interval to fill the pores with the dopant solution, precipitating the dopant into the porous matrix approximately uniformly throughout, soaking the preform into a solvent solution having a solubility for the dopant lower than such predetermined solubility of the dopant in the stuffing solution for a time interval sufficient to cause substantially all of the dopant to redissolve and for diffusion to take place out of the porous matrix in such a way that the dopant concentration decreases as a function of radial distance from the central axis, precipitating the dopant in the porous matrix by reducing the temperature of the preform to a level such that the dopant is precipitated out of solution, removing solvent and where necessary decomposition products from the preform, and heating to consolidate the preform to produce a glass article having a graded refractive index profile of the parabolic nature.

The solubility of the solvent solution for the dopant is preferably between 0.5 and 0.9 of the solubility of the dopant in the stuffing solution. The temperature of the solvent solution is preferably between 55° C. and 85° C. depending on the solvent solution used, most preferably between 65° C. and 75° C. The soaking time is preferably between 10 and 180 minutes, most preferably between 30 and 90 minutes for a preform having a radius of 4 mm.

The solvent solution can be water or low molecular weight alcohols (less than 5 carbon atoms) in water. The preferred solvent solution is a mixture of 20 to 60% ethanol in water at a temperature of about 70° C. Preferably, the soaking time should be within the range between 10 minutes less than and 20 minutes more than the time required for the complete dissolution of the dopant.

SHORT DESCRIPTION OF THE DRAWINGS

The invention will now be disclosed, by way of examples, with reference to the accompanying drawings in which.

DETAILED DESCRIPTION OF THE INVENTION

In practicing the invention, a porous glass preform with interconnected pores is used. Such porous glass preform is preferably an alkali borosilicate glass formed by phase separation and leaching as disclosed in U.S. Pat. No. 3,938,974 issued Feb. 17, 1976 or U.S. Pat. Nos. 4,110,093 and 4,110,096 issued Aug. 29, 1978. However, other porous glass preforms such as the ones disclosed in U.S. Pat. No. 3,859,073 could also be used. The porous glass preform is stuffed by soaking in a solution containing one or more index modifying dopants of predetermined solubility in the stuffing solution for a time sufficient to completely fill the pores. The predetermined solubility of the one or more index modifying dopants in the stuffing solution is preferably 40 to 90 weight percent. The solution may be water and the dopant(s) one or a combination of the ones disclosed in U.S. Pat. Nos. 4,110,093 and 4,110,096, in particular, Ge, Pb, Al, P, B, the alkali metals, the alkaline earths and the rare earths in the form of oxides, nitrates, carbonates, acetates, phosphates, borates, arsenates and other suitable salts in either hydrated or unhydrated form. Preferred dopants are Cs, Rb, or K nitrates, used independently or as joint dopants with Na, Bi, Sr or Pb nitrates.

Once the pores of the preform are completely filled with the dopant solution, the dopant is precipitated into the pores approximately uniformly throughout. The dopant may be precipitated by transferring the preform to a solvent solution at room temperature, preferably about 25° C. for a short time period, preferably about 15 secs., although other methods of inducing precipitation of the dopant are also envisaged, such as alteration of the solution pH to a point of precipitation, replacement of the original solvent by a solvent in which the dopant is less soluble, introduction of a chemical into the solution which reacts with the original dopant to form a less soluble dopant species, evaporation of some of the original solvent as by air drying, or any combination of the above techniques. A preferred solvent solution is a 40% ethanol, 60% water mixture. However, the solvent solution may be water, or 20 to 60% ethanol-water, propanol-water or methanol-water mixtures.

The preform is subsequently soaked in a solvent solution having a solubility for the dopant which is lower than the solubility of the dopant in the stuffing solution for a time interval sufficient to cause substantially all of the dopant to redissolve and diffuse out of the matrix in such a way that the dopant concentration decreases radially from the central axis of the preform. The solubility of the solvent solution is preferably between 0.5 and 0.9 the solubility of the dopant in the stuffing solution. The temperature of the solvent solution is preferably between 55° C. and 85° C. depending on the solvent used, most preferably between 65° C. and 75° C. The soaking time is between 10 and 180 minutes, preferably between 30 and 90 minutes, most preferably between 45 and 90 minutes for a preform having a radius of 4 mm. The solvent solution is preferably water or a low molecular weight alcohol (less than 5 carbon atoms) in water. The preferred alcohol is ethanol or propanol and the most preferred solution is 20 to 60% ethanol in water. The soaking time should be within the range between 10 minutes less than and 20 minutes more than the dissolution time $t_d$ of the dopant as indicated by a change in the appearance of the preform from opaque to clear. Generally, under these circumstances, $t_d$ is about 60–70 minutes.

The preform is finally transferred to a solvent solution at about 0° C. to cause final precipitation of the dopant. The preferred solvent solution is 100% ethanol or 100% propanol.

Following precipitation of the dopant, the preform is dried and heated to 625° C. whereby the solvents and the gaseous decomposition products from the dopant compound are removed and, the dopant compound oxidized. Further heating to 835°–850° C. allows consolidation to take place and yields a solid preform having a refractive graded index profile of the near parabolic nature.

The measure of degree of inaccuracy of a final profile when compared to the desired profile can be expressed in terms of a normalized root mean standard deviation (NRMSD) which is defined as the square root of the standard deviation of a least-squares-fit of the measured profile $[n(r)_{meas}]$ to the desired profile $[n(r)_{calc}]$, which is then normalized by the difference in index of refraction between the maximum and minimum points of the ideal mathematical curve as follows:

$$NRMSD = \frac{\{<[n(r)_{meas} - n(r)_{calc}]^2>\}^{\frac{1}{2}}}{n_{max} - n_{min}}$$

wherein $<->$ means an average over all the measurements.

EXAMPLE 1

Figure 1:
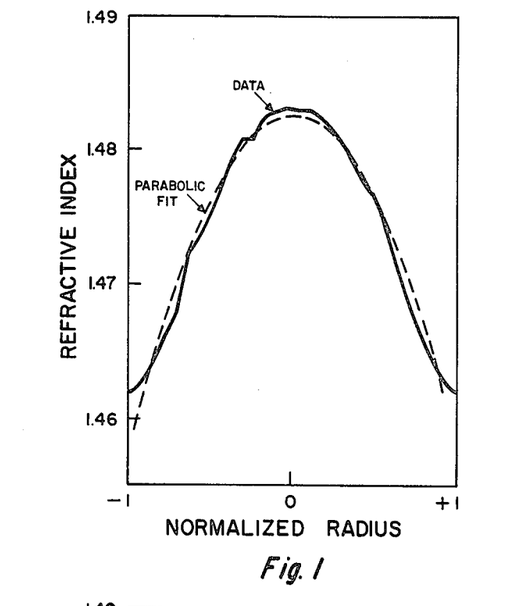
FIG. 1 is a plot of refractive index profile as a function of radial distance for a preform treated in accordance with the process of the present invention as compared to a profile of true parabolic nature.

A porous glass rod having a nominal composition in weight % of 56.6% silica, 35.1% boric oxide, 3.4% sodium oxide and 4.9% potassium oxide was heat treated at 550° C. for 90 minutes, and soaked in a 68% $CsNO_3$ stuffing solution at 100° C. for about three hours. The rod, its pores filled with $CsNO_3$ dopant solution was then transferred to a 40% ethanol-water solution at 25° C. for 15 secs. in order to induce precipitation of the $CsNO_3$ in the pores. It was then soaked in a 40% ethanol-water solvent solution at a temperature of about 70° C. for a time interval to completely redissolve the dopant as indicated by the clear appearance of the preform (about 65 minutes). The rod was then transferred to a 100% ethanol solution at 0° C. to precipitate the dopant, heated to remove the solvent and decomposition products and finally heated to consolidate the preform. A plot of the index profile normalized by the rod radius is shown in FIG. 1 compared to a perfect parabolic. The normalized mean square deviation was $4 \times 10^{-2}$.

The small discontinuities in the profile are due to non-homogeneities in the pores.

EXAMPLE 2

Figure 2:
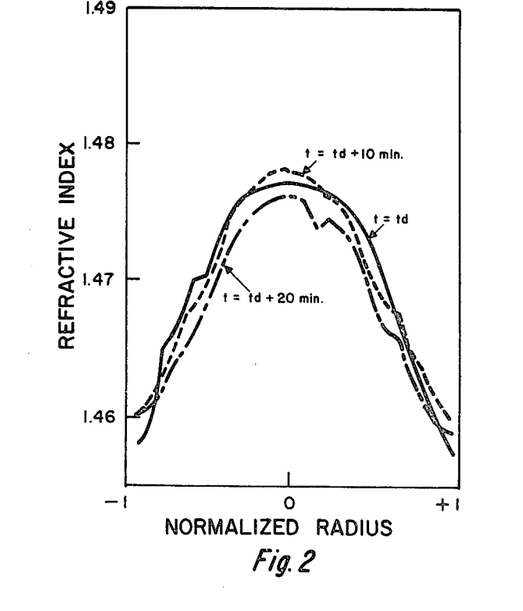
FIG. 2 shows various refractive index profiles as a function of radial distance, obtained as a function of soak times equal or longer than the dissolution time of the dopant with a preform soaked in a solvent solution of 40% ethanol-water at 70° C.

The effect of increasing soak time t beyond the dissolution time $t_d$ for a sample having the same nominal composition as in Example 1 and otherwise treated as in Example 1 is illustrated in FIG. 2 of the drawings and given in the following Table I:

TABLE I

| Soak Time | $t_{ppt}$ | Max. Index |
|---|---|---|
| $t = t_d$ | 10 sec | 1.4770 |
| $t = t_d + 10$ min | 21 min | 1.4780 |
| $t = t_d + 20$ min | 34 min | 1.4760 |

It will be seen that increasing the soak time beyond the dissolution time $t_d$ using the above solvent solution and temperature has little effect on the resulting profiles. In addition, the final precipitation time $t_{ppt}$ is much shorter when $t = t_d$. This selection has given good reproducibility and a significant insensitivity to the soak time beyond the redissolution of the dopant crystals.

EXAMPLE 3

Figure 3:
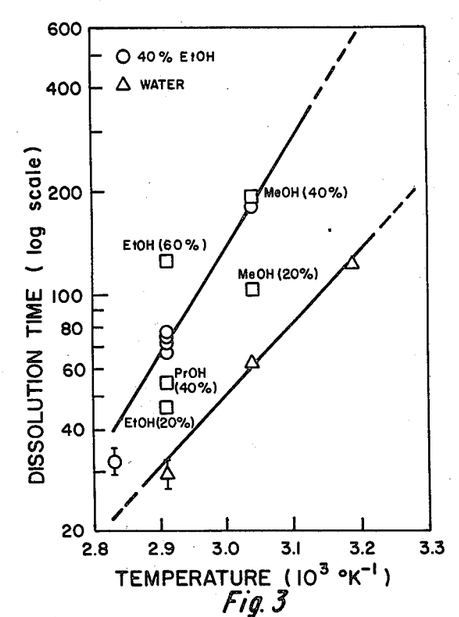
FIG. 3 shows the dissolution times obtained with a preform soaked in various solvent solutions, as a function of temperature.

The dissolution times $t_d$ for various solvent solutions at four different temperatures are shown in FIG. 3 and in the following Table II at two of the temperatures for a sample having the same nominal composition as in Example 1 and otherwise treated as in Example 1.

TABLE II

|  | Solvent | $t_d$ |
|---|---|---|
| at 70° C. | Water | 30 min |
|  | 20% Ethanol | 47 min |
|  | 40% Propanol | 55 min |
|  | 40% Ethanol | 68–78 min |
|  | 60% Ethanol | 125 min |
| at 55° C. | Water | 63 min |
|  | 20% Methanol | 103 min |
|  | 40% Ethanol | 180 min |
|  | 40% Methanol | 193 min |

If $t_d = a\ e^{E/RT}$ than for water: $a = 1.38 \times 10^{-5}$, $E/R = 5013$, for 40% ethanol: $a = 1.43 \times 10^{-7}$, $E/R = 6872$.

The above results show that shorter dissolution times are obtained at a temperature of 70° C. than at 55° C. These dissolution times are suitable for industrial processing.

EXAMPLE 4

Figure 4:
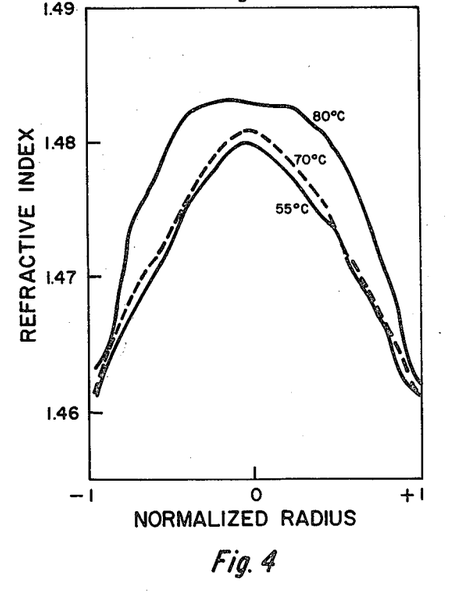
FIG. 4 shows various profiles as a function of radial distance, obtained by soaking a preform in a 40% ethanol-water solution at various temperatures.
Figure 5:
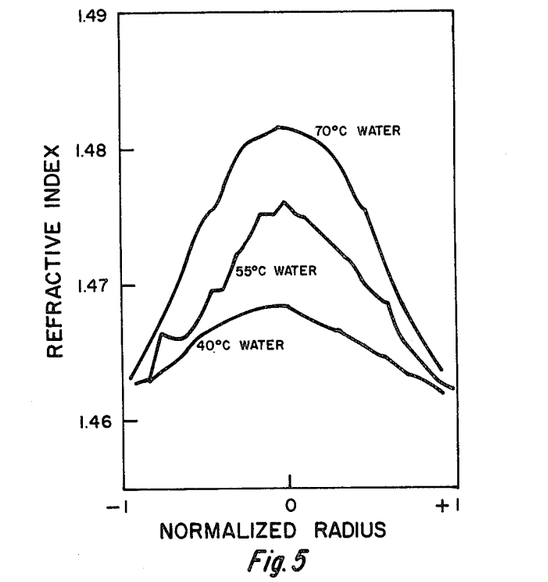
FIG. 5 shows various profiles as a function of radial distance, obtained by soaking a preform in an aqueous solvent solution at various temperatures.

The effect of solvent temperature on the nature of the final profiles for solvent solutions of 40% ethanol-water and 100% water is shown in FIGS. 4 and 5 of the drawings, respectively, and in the following Table III for samples having the same nominal composition as in Example 1 and otherwise treated as in Example 1.

TABLE III

|  | $T_1$ | Max. Index | Profile |
|---|---|---|---|
| 40% ethanol-water | 80° C. | 1.4830 | flat top |
|  | 70° C. | 1.4810 | parabolic |
|  | 55° C. | 1.4800 | sharp peak |
| 100% water | 70° C. | 1.4820 | parabolic |
|  | 55° C. | 1.4750 | sharp peak |
|  | 40° C. | 1.4685 | low parabolic |

It will be seen from the above Table that the best parabolic profiles with high numerical apertures are obtained at a temperature of about 70° C.

EXAMPLE 5

Figure 6:
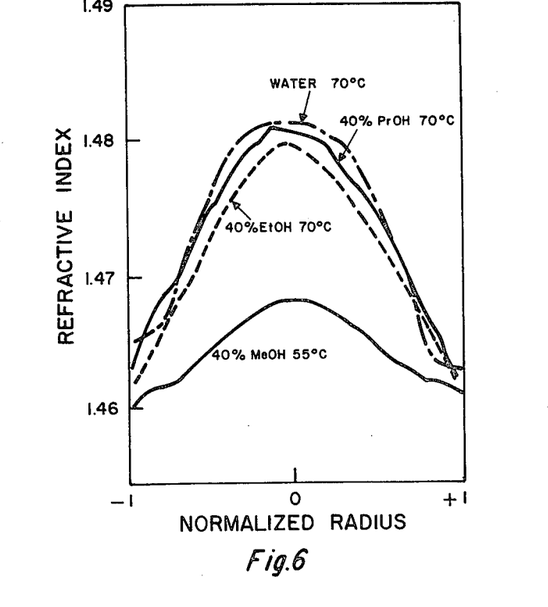
FIG. 6 shows various profiles as a function of radial distance, obtained by soaking a preform in various solvent solutions at 55° C. and 70° C.

FIG. 6 shows that when the unstuffing temperature is 70° C. and $t = t_d$, water, 40% propanol-water, and 40% ethanol-water solvent solutions yield good profiles. FIG. 6 also shows that when the unstuffing temperature is 55° C. and $t = t_d$, a 40% methanol-water solution, which has a boiling point below 70° C., yields a lower refractive index profile. The sample had the same nominal composition as in Example 1 and was otherwise treated as in Example 1.

EXAMPLE 6

Figure 7:
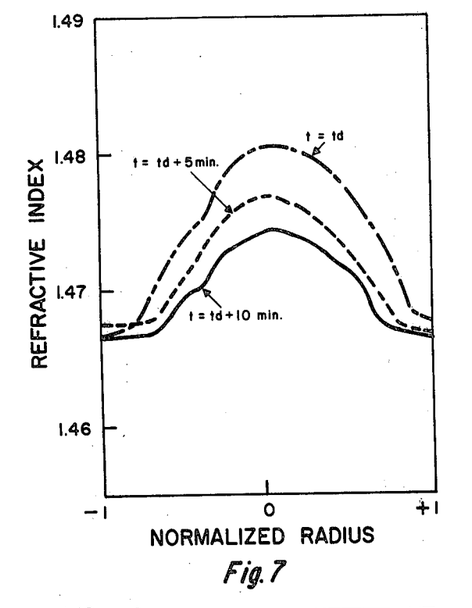
FIG. 7 shows various profiles as a function of radial distance, obtained when soaking of a preform is ended at and a few minutes after complete dissolution of the dopant using water as the soaking solution.

Unstuffing in water, however appears to be very sensitive to the soak time beyond the dissolution of dopant crystals as illustrated in FIG. 7 and in the following Table IV for a sample having the same nominal composition as in Example 1 and otherwise treated as in Example 1.

TABLE IV

| Soak Time | $t_{ppt}$ | Max. Index |
|---|---|---|
| $t = t_d$ | 10 sec | 1.4810 |
| $t = t_d + 5$ min | 24 min | 1.4770 |
| $t = t_d + 10$ min | 22 min | 1.4740 |

Therefore, water is not recommended as a solvent solution unless other reasons indicate its use. If water is used, care must be taken to end the soak very soon after the dissolution of the dopant crystals.

When processing many preforms together, it is advisable that they be chosen with the same diameter in order to have the same $t_d$. Then soak time should be allowed to last 1–3 minutes past $t_d$ in order to assure complete dissolution of crystals in all the rods. It is possible to account for differences in diameter by the following relationship:

$$t' = t \left[ \frac{r'}{r} \right]^2$$

where t is the soak time for a rod of radius r and t' the soak time for a rod of radius r'. All times reported have been normalized to a 4 mm rod and have to be adjusted depending on the radius of the rod.

The precipitation time after profiling $t_{ppt}$ is best controlled when the soaking time is equal to the dissolution time. For example, when $t=t_d$, the precipitation time after profiling is always 10 seconds as shown in Tables I and IV. In addition, when the soak time beyond dissolution is large, precipitation after profiling may not occur simultaneously along the axis of the preform, causing possible uniformity problems. Applicants measurements have indicated that the coefficient for diffusion of $CsNO_3$ as a dopant in the 40% ethanol-water mixture is very low at 70° C. and therefore small differences in soaking time will not change the profile.

The solvent used for the final precipitation may be either ethanol or propanol at 0° C. with no difference. In order to clear the surface of the preform completely from dopants, it is advisable to follow the following additional processing steps:

(a) Soak preforms in 100% ethanol or propanol solvent solution until their temperature has equilibrated at 0° C. and until the solvent has diffused thoroughly into the pores.

(b) Soak the preforms in 20° C. (room temperature) methanol until a very thin clad appears (as seen by an optical microscope).

(c) Cool to 0° C. in methanol.

(d) Return to the 100% ethanol or propanol solvent solution for about 16 hours prior to drying. In this last step, methanol at 0° C. may be used as a solvent if careful control is exercised to avoid a long soaking time. In the above procedure, any low solubility alcohol ($\sim 0.3$ gm/100 ml solution) may be used in place of methanol. Mixtures of 85% ethanol or propanol in water could also be used.

EXAMPLE 7

Figure 8:
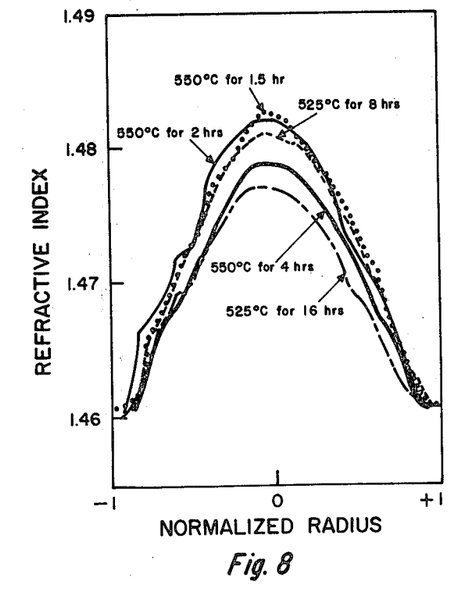
FIG. 8 shows various profiles as a function of radial distance, with preforms having undergone different heat treatments prior to treatment in accordance with the invention.

It has also been found that the heat treatment conditions for the preparation of the porous glass slightly affect the profile. FIG. 8 and the following Table V show that as the microstructure is developed to a larger size by longer heat treatments, the profile has a lower maximum index but still a good parabolic profile. The preforms had the same nominal composition as in Example 1 and were otherwise treated as in Example 1.

TABLE V

| Heat Treatment | Time (hrs) | Max. Index |
|---|---|---|
| 550° C. | 1.5 | 1.5825 |
| 550° C. | 2 | 1.4820 |
| 550° C. | 4 | 1.4790 |
| 525° C. | 8 | 1.4810 |
| 525° C. | 16 | 1.4770 |

While there is some difference in the maximum index, it is important to observe that unlike the one-step processes, the method in accordance with the invention yields a good parabolic profile independent of the glass pore size.

EXAMPLE 8

Figure 9:
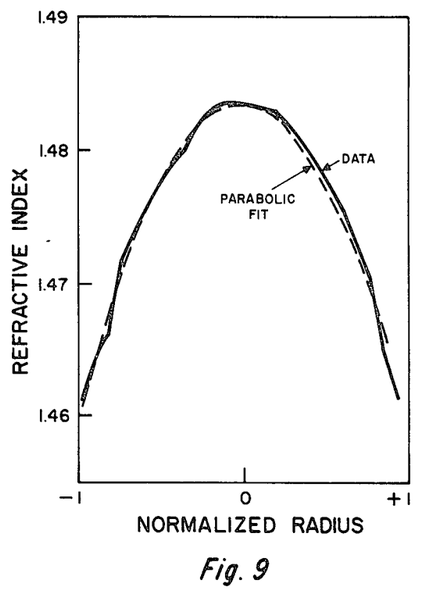
FIG. 9 is another plot of the refractive index profile as a function of radial distance for a preform treated in accordance with the process of the invention compared to a perfect parabolic profile.
Figure 10:
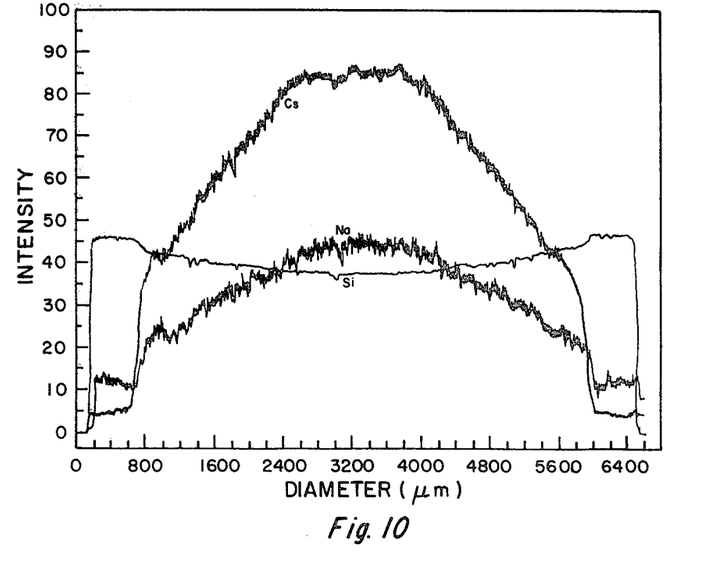
FIG. 10 shows a plot of the variation in concentration of the dopant in the consolidated glass across the diameter of the preform.

A porous glass rod was soaked according to Example 1. The rod, its pores filled with $CsNO_3$ dopant solution was then immersed in room temperature water for 15 secs in order to induce precipitation of the dopant. It was then soaked in a 3.9 Molar solution of $NaNO_3$ in water at 70° C. The precipitated dopant dissolved in 83 minutes. The rod was then washed in water at 70° C. for 30 seconds and soaked in propanol at 0° C. for 16 hours. The second precipitation occurred in 10 seconds after transfer to the propanol. The rod was then heated to remove the solvent and decomposition products and finally heated to consolidate the rod. A plot of the index profile obtained is shown in FIG. 9 compared to a perfect parabola. The calculated NRMSD was $2 \times 10^{-2}$. FIG. 10 shows a plot of the variation in concentration of Cs, Na and Si in the consolidated glass across a diameter as measured by an electron microprobe.

The preform may be subsequently heated to soften it and pulled according to known practice to make a fiber for optical communication applications or to make a rod of 1–3 mm in diameter for other applications.

To conclude the above, the method in accordance with the invention is superior to the previously known methods because of the following reasons:

(1) It produces excellent parabolic profiles with high numerical apertures.

(2) Uniform final precipitation occurs over the length of the preform.

(3) Precipitation times are predictable.

(4) There is a lessened dependence of the shape of profiles on glass pore size.

(5) The shape of profiles is less sensitive to the precipitation time. The profiles obtained by the process in accordance with the invention yield moderate to high numerical apertures (0.22–0.28) and fit parabolic shapes better than the previously disclosed one step processes.

The embodiments of the invention in which an exclusive property or privilege is claimed are defined as follows:

1. A method of producing a glass article having a graded refractive index profile of a near parabolic nature, comprising:

(a) soaking a preform having a porous matrix with interconnected pores in a stuffing solution containing at least one index modifying dopant of predetermined solubility in the stuffing solution for a time interval to fill the pores with the dopant solution;

(b) precipitating the dopant into the porous matrix approximately uniformly throughout;

(c) soaking the preform into a solvent solution having a solubility for the dopant lower than said predetermined solubility of the dopant in the stuffing solution for a time interval sufficient to cause substantially all of the dopant to redissolve and for diffusion to take place out of the porous matrix in such a way that the dopant concentration decreases as a function of radial distance from the central axis;

(d) precipitating the dopant in the porous matrix by reducing the temperature of the preform to a level such that the dopant is precipitated out of solution;

(e) removing the solvent and where necessary decomposition products from the preform; and (f) heating to consolidate the preform to produce a glass article having a graded refractive index profile of the parabolic nature.

2. A method as defined in claim 1, wherein the solubility of the solvent solution for the dopant in step (c) is between 0.5 to 0.9 of said predetermined solubility.

3. A method as defined in claim 1, wherein the temperature of the solvent solution in step (c) is between 55° C. and 85° C.

4. A method as defined in claim 1, wherein the soaking time in step (c) for a rod radius $r'$ millimeters is between $10 \times (r'/4)^2$ minutes and $180 \times (r'/4)^2$ minutes.

5. A method as defined in claim 1, wherein the dopant in step (b) is precipitated in a solvent solution different from the solvent solution of step (c).

6. A method as defined in claim 1, wherein the solvent solution in step (c) is a low molecular weight alcohol having less than five carbon atoms in water.

7. A method as defined in claim 6, wherein the solvent solution is ethanol or propanol in water.

8. A method as defined in claim 7, wherein the solvent solution is 20 to 60% ethanol in water.

9. A method as defined in claim 3, wherein the temperature of the solvent solution is between 65° and 75° C.

10. A method as defined in claim 4, wherein the soaking time is between 30 minutes and $90 \ X(4'/4)^2$ minutes.

11. A method as defined in claim 10, wherein the soaking time is between 45 minutes and $90 \ X(r'/4)^2$ minutes.

12. A method as defined in claim 1, wherein the soaking time is within the range between 10 minutes less than and 20 minutes more than the dissolution time of the dopant.

13. A method as defined in claim 1, wherein the solvent in step (d) is ethanol or propanol.

14. A method as defined in claim 13, wherein the preform is soaked in the solvent solution of step (d) until its temperature has equilibrated at 0° C. and until the solvent has diffused thoroughly into the porous matrix, and further comprising the steps of subsequently soaking the preform in a solvent solution having a solubility of about 0.3 g/100 ml of solution at about room temperature until a very thin clad appears, cooling the solution to about 0° C., and returning the preform to solvent solution of step (d) for about 16 hours.

15. A method as defined in claim 1, further comprising heating the glass article to soften it and pulling it into a fiber.

16. A method as defined in claim 1, further comprising heating the glass article to soften it and pulling it into a rod of 1–3 mm in diameter.

* * * * *

UNITED STATES PATENT AND TRADEMARK OFFICE
CERTIFICATE OF CORRECTION

PATENT NO. : 4,302,231
DATED : November 24, 1981
INVENTOR(S) : Pedro B. MACEDO et al It is certified that error appears in the above—identified patent and that said Letters Patent is hereby corrected as shown below:

Claims 10 and 11 should read as follows:

10. A method as defined in claim 4, wherein the soaking time is between $30 \times \left(\frac{r'}{4}\right)^2$ minutes and $90 \times \left(\frac{r'}{4}\right)^2$ minutes.

11. A method as defined in claim 10, wherein the soaking time is between $45 \times \left(\frac{r'}{4}\right)^2$ minutes and $90 \times \left(\frac{r'}{4}\right)^2$ minutes.

Signed and Sealed this

Twenty-ninth Day of March 1983

[SEAL]

Attest:

*Attesting Officer*

GERALD J. MOSSINGHOFF
*Commissioner of Patents and Trademarks*